United States Patent
Tsai et al.

(10) Patent No.: US 6,355,739 B1
(45) Date of Patent: Mar. 12, 2002

(54) RESIN COMPOSITION RECLAIMED FROM COMPACT DISK WASTE

(75) Inventors: Shih-Jung Tsai; Hsin-Ching Kao, both of Hsinchu; Wen-Ling Lui, Ilan, all of (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 09/541,602

(22) Filed: Apr. 3, 2000

(30) Foreign Application Priority Data

Dec. 28, 1999 (TW) ........................................ 88123115 A

(51) Int. Cl.⁷ ............................................... C08G 64/42
(52) U.S. Cl. ......................... 525/461; 521/40; 525/461; 525/462; 524/401
(58) Field of Search ........................... 521/40; 525/461, 525/462; 524/401

(56) References Cited

U.S. PATENT DOCUMENTS 5,807,932 A * 9/1998 Pfaendner et al.

* cited by examiner

*Primary Examiner*—Robert Dawson
*Assistant Examiner*—Kuo-Liang Peng
(74) *Attorney, Agent, or Firm*—Sughrue Mion, PLLC

(57) ABSTRACT

The present invention discloses a resin composition reclaimed from compact disk waste having improved mechanical characteristics. The resin composition in accordance with the present invention comprises (a) compact disk waste comprising polycarbonate (PC) as a primary component; and (b) a coupling agent containing two or more reactive functional groups. Optionally, the resin composition of the present invention may further comprise (c) an impact-resistant thermoplastic resin, engineering plastic grade PC or waste thereof, or recycled bottle grade PC.

25 Claims, No Drawings

RESIN COMPOSITION RECLAIMED FROM COMPACT DISK WASTE

BACKGROUND OF THE INVENTION

1. Field of the Invention

The present invention relates in general to a high performance resin composition. More particularly, it relates to a resin composition reclaimed from compact disk waste with improved mechanical characteristics.

2. Description of the Related Arts

At present, more than about 1.2 billion optical recording disks (i.e., compact disks) are produced yearly in Taiwan. A large quantity of polycarbonate wastes are produced in injection molding of compact disks, and a large amount of waste disks are produced because of defects. These disk wastes contain brittle components added in order to reduce birefringence of the disks. Thus, the disk wastes are low in impact resistance and have poor mechanical characteristics compared with a general engineering molded grade material. Thus, these materials cannot be reused for other high-quality moldings by directly re-processing or blending with other polymers. For the most part, these disk wastes are not recycled.

SUMMARY OF THE INVENTION

Accordingly, an object of the invention is to obtain from compact disk waste a reclaimed resin material with a mechanical strength sufficient for use in a general molded product.

To attain the above object, a resin reclaimed from an optical recording disk comprising polycarbonate (hereinafter referred to as PC) as a primary component is added with a coupling agent in order to increase the molecular weight and the mechanical strength by an in-situ coupling reaction. Optionally, a compatible resin such as a low-priced thermoplastic resin, engineering plastic grade PC or waste thereof, or recycled bottle grade PC is added to improve the mechanical strength to an extent comparable to that of engineering plastic. Thereby, a resin material of high performance relative to cost can be obtained.

The resin material of the present invention provides improved mechanical characteristics. In particular, the impact value can be improved. Thus, the usage of the recycled resin material can be considerably expanded. In addition, because the optical recording disk material has excellent flowability, the resin material of the present invention is superior in processibility.

DETAILED DESCRIPTION OF THE INVENTION

The reclaimed resin material of the present invention is made by combining the compact disk waste with a coupling agent containing two or more functional groups reactive with terminal hydroxy groups of polycarbonate. Thus, the molecular weight and the mechanical characteristics thereof can be improved by an in-situ coupling reaction when proceeding extrusion of the resin material.

Furthermore, the toughness of the reclaimed resin material is increased by combining the compact disk waste with a compatible resin such as, for example, a low-priced thermoplastic resin (ABS, MBS, PBT, PET, etc.), engineering plastic grade PC or waste thereof, recycled bottle grade PC, and the like.

The reclaimed resin material can further include a flame retardant or other conventional additives such as reinforced fiber to improve its properties.

According to a first embodiment of the invention, there is provided a resin composition reclaimed from compact disk waste comprising (a) compact disk waste comprising polycarbonate as a primary component; and (b) 0.1–15 wt %, based on the weight of the compact disk waste, of a coupling agent containing two or more reactive functional groups.

According to a second embodiment of the invention, there is provided a resin composition reclaimed from compact disk waste comprising (a) 35–95 parts by weight of compact disk waste comprising polycarbonate as a primary component; (b) 65–5 parts by weight of an impact-resistant thermoplastic resin; and (c) 0.1–15 wt %, based on the total weight of the component (a) and (b), of a coupling agent containing two or more reactive functional groups.

According a third embodiment of the invention, there is provided a resin composition reclaimed from compact disk waste comprising (a) 30–90 parts by weight of compact disk waste comprising polycarbonate as a primary component; (b) 70–10 parts by weight of engineering plastic grade polycarbonate or waste thereof, or recycled bottle grade polycarbonate; and (c) 0.1–15 wt %, based on the total weight of the component (a) and (b), of a coupling agent containing two or more reactive functional groups.

In accordance with the present invention, any suitable coupling agents having two or more functional groups reactive with hydroxy groups may be used. Such coupling agents include, for example, anhydrides, isocyanates, epoxides, and urethanes.

Examples of suitable anhydride coupling agents include pyromellitic dianhydride (PMDA), 3,3', 4,4'-benzophenone tetracarboxylic dianhydride (BTDA), 3,3', 4,4'-biphenyl tetracarboxylic dianhydride (BPDA), terphenyl tetracarboxylic dianhydride (TPDA), 2,2-bis (3,4-dicarboxyphenyl) hexafluoropropane dianhydride (6FDA), 1,1-bis(3,4-dicarboxyphenyl anhydride)-1-phenyl-2,2,2-trifluoroethane (3FDA), 9,9-bis(trifluoromethyl)-2,3,6,7-xanthene tetracaboxylic dianhydride (6FCDA), and trimellitic anhydride (TMA).

Examples of suitable isocyanate coupling agents include tris(2-carboxylethyl) isocyanate, diphenylmethane- 4,4'-diisocyanate (MDI), polymethylenephenylene isocyanate (PMPI), hexamethylene diisocyanate, toluene diisocyanate (TDI), 1,5-naphthalene diisocyanate (NDI), 4,6'-xylene diisocyanate (XDI), 3,3'-dimethyldiphenyl 4,4'-diisocyanate (TDDI), para-phenylene diisocyanate (PPDI), 3,3'-dimethyldiphenylmethane 4,4'-diisocyanate (DMMDI), and dianisidine diisocyanate (DADI).

Examples of suitable epoxide coupling agents include epoxidized styrenic copolymers, epoxidized olefinic copolymer, glycerol polyglycidyl ether, diglycidyl terephthalate, diglycidyl orthophthalate, and pentaerythritol polyglycidyl ether.

The impact-resistant thermoplastic resins useful in the present invention include those low-priced thermoplastic resins that can improve toughness to polycarbonate. Some examples for such thermoplastic resins include acrylonitrile-butadiene-styrene copolymer (ABS), methacrylate-butadiene-styrene copolymer (MBS), acrylonitrile-acrylic rubber-styrene copolymer (AAS), acrylonitrile-ethylene propylene rubber-styrene copolymer (AES), acrylonitrile-chlorinated polyethylene rubber-styrene copolymer (ACS), polybutylene terephthalate (PBT), polyethylene terephthalate (PET), acrylic rubber, styrene-butadiene-styrene block copolymer (SBS), and styrene-ethylented-butadiene-styrene elastomer (SEBS).

The reclaimed resin material according to the invention can be reprocessed in the same way as the original resins to produce any of a variety of moldings in standard machines such as extruders or injection molding machines. The moldings obtained can then be used for a wide range of applications, such as in the electronic products or as camera casings.

Further, reclaimed resin material according to the invention may be provided, before or during processing, with the usual flame retardants to obtain flame resistance products; or they can be provided with reinforced fiber or fillers to obtain molded products having high stiffness, impact strength, and heat resistance. Other conventional additives can be added to the resin material, including antioxidants, heat stabilizers, lubricants, etc.

Without intending to limit it in any manner, the present invention will be further illustrated by the following examples.

EXAMPLES 1–4 AND COMPARATIVE EXAMPLE 1

Table 1 shows the components and their amounts (parts by weight) used in Examples 1–4 and Comparative Example 1.

Compact disk waste and coupling agents were dry-blended according to the formulations listed in Table 1, and fed into a twin-screw extruder for pelletization. The pellets obtained were injection molded into test specimens and evaluated for mechanical properties according the ASTM procedures. The results are also listed Table 1.

TABLE 1

| Components | Com. 1 | Ex. 1 | Ex. 2 | Ex. 3 | Ex. 4 |
|---|---|---|---|---|---|
| CD waste | 100 | 100 | 100 | 100 | 100 |
| Expoxidized styrenic copolymers | — | 5 | — | 10 | 3 |
| Epoxidized olefinic copolymer | — | — | 5 | — | — |
| Intrinsic Viscosity (IV) | 0.34 | 0.57 | 0.55 | 0.59 | 0.53 |
| Notched izod impact strength (ft-lb/in) | 0.5 | 8.2 | 7.9 | 10.5 | 7.5 |

EXAMPLES 5–10 AND COMPARATIVE EXAMPLES 2–4

Table 2 shows the components and their amounts (parts by weight) used in Examples 5–10 and Comparative Examples 2–4.

Compact disk waste, compatible resins (PC, ABS, MBS, PBT) and coupling agents were dry-blended according to the formulations listed in Table 2, and fed into a twin-screw extruder for pelletization. The pellets obtained were injection molded into test specimens and evaluated for mechanical properties according the ASTM procedures. The results are also listed Table 2.

TABLE 2

| Components | Com. 2 | Com. 3 | Com. 4 | Ex. 5 | Ex. 6 | Ex. 7 | Ex. 8 | Ex. 9 | Ex. 10 |
|---|---|---|---|---|---|---|---|---|---|
| CD waste | 100 | — | 50 | 50 | 90 | 80 | 50 | 50 | 50 |
| PC* | — | 50 | — | — | — | — | — | — | — |
| ABS | — | 50 | 50 | 50 | — | — | 50 | 50 | — |
| MBS | — | — | — | — | 10 | 20 | — | — | — |
| PBT | — | — | — | — | — | — | — | — | 50 |
| Coupling Agent | — | — | — | 0.5[1] | 0.5[1] | 0.5[1] | 0.5[2] | 0.5[3] | 3[4] |
| Notched izod impact strength (ft-lb/in) | 0.5 | 7.4 | 0.8 | 7.2 | 7.5 | 9.7 | 7.0 | 7.8 | 9.7 |
| HDT** (264 psi, °C.) | 130 | 101 | 99 | 101 | 128 | 120 | 101 | 101 | 88 |

*virgin PC (engineering plastic grade)
**Heat Distortion Temperature
[1]anhydride coupling agent
[2]isocyanate coupling agent
[3]epoxide coupling agent
[4]expoxidezed styrene copolymer

EXAMPLES 11–15 AND COMPARATIVE EXAMPLES 5–6

Table 3 shows the components and their amounts (parts by weight) used in Examples 11–15 and Comparative Examples 5–6.

Compact disk waste, engineering plastic grade PC or waste thereof, recycled bottle grade PC, and coupling agents were dry-blended according to the formulations listed in Table 3, and fed into a twin-screw extruder for pelletization. The pellets obtained were injection molded into test specimens and evaluated for mechanical properties according the ASTM procedures. The results are also listed Table 3.

TABLE 3

| Components | Com. 5 | Com. 6 | Ex. 11 | Ex. 12 | Ex. 13 | Ex. 14 | Ex. 15 |
|---|---|---|---|---|---|---|---|
| CD waste | 50 | 50 | 50 | 50 | 50 | 50 | 50 |
| Waste PC (Engineering plastic grade) | 50 | — | 50 | 50 | 50 | — | — |
| Virgin PC (Engineering plastic grade) | — | 50 | — | — | — | 50 | — |
| Recycled bottle grade PC | — | — | — | — | — | — | 50 |
| Coupling agent | — | — | 3[1] | 3[2] | 3[3] | 5[1] | 1[1] |

TABLE 3-continued

| Components | Com. 5 | Com. 6 | Ex. 11 | Ex. 12 | Ex. 13 | Ex. 14 | Ex. 15 |
|---|---|---|---|---|---|---|---|
| Notched izod impact strength (ft-lb/in) | 1.8 | 1.9 | 10.6 | 10.1 | 10.5 | 12.7 | 10.6 |

[1] expoxidized styrenic copolymer
[2] expoxidized olefinic copolymer
[3] urethane coupling agent Tables 1–3 clearly show that the mechanical characteristics of the test specimens were dramatically improved by utilizing the coupling agents and the compatible resins. In particular, according to the test specimens of Examples 5, 8, and 9, it is to be appreciated that the shock values thereof are comparable to that of the virgin PC product (Comparative Example 3). Accordingly, as the resin of the present invention exhibits higher Izod shock value, it can be used to obtain a molded product having a shock-resistance sufficient for a wide range of applications.

While the invention has been particularly shown and described with reference to the preferred embodiment thereof, it will be understood by those skilled in the art that various changes in form and details may be made without departing from the spirit and scope of the invention.

What is claimed is:

1. A resin composition reclaimed from compact disk waste comprising:
    (a) compact disk waste comprising polycarbonate as a primary component; and
    (b) 0.1–15 wt %, based on the weight of the compact disk waste, of a coupling agent containing two or more reactive functional groups.

2. The resin composition as claimed in claim 1, wherein said coupling agent is selected from the group consisting of anhydrides, isocyanates, epoxides, and urethanes.

3. The resin composition as claimed in claim 2, wherein said coupling agent is an anhydride selected from the group consisting of pyromellitic dianhydride, 3,3',4,4'-benzophenone tetracarboxylic dianhydride, 3,3', 4,4'-biphenyl tetracarboxylic dianhydride, terphenyl tetracarboxylic dianhydride, 2,2-bis(3,4-dicarboxyphenyl) hexafluoropropane dianhydride, 1,1-bis(3,4-dicarboxyphenyl anhydride)-1-phenyl-2,2,2-trifluoroethane, 9,9-bis(trifluoromethyl)-2,3,6,7-xanthene tetracaboxylic dianhydride, and trimellitic anhydride.

4. The resin composition as claimed in claim 2, wherein said coupling agent is an isocyanate selected from the group consisting of tris(2-carboxylethyl) isocyanate, diphenylmethane-4,4'-diisocyanate, polymethylenephenylene isocyanate, hexamethylene diisocyanate, toluene diisocyanate, 1,5-naphthalene diisocyanate, 4,6'-xylene diisocyanate, 3,3'-dimethyldiphenyl 4,4'-diisocyanate, paraphenylene diisocyanate, 3,3'-dimethyl-diphenylmethane 4,4'-diisocyanate, and dianisidine diisocyanate.

5. The resin composition as claimed in claim 2, wherein said coupling agent is an epoxide selected from the group consisting of epoxidized styrenic copolymers, epoxidized olefinic copolymer, glycerol polyglycidyl ether, diglycidyl terephthalate, diglycidyl orthophthalate, and pentaerythritol polyglycidyl ether.

6. The resin composition as claimed in claim 1, further comprising a flame retardant.

7. The resin composition as claimed in claim 1, further comprising an additive selected from the group consisting of reinforced fibers, fillers, antioxidants, heat stabilizers, and lubricants.

8. A molded article made from a resin composition reclaimed from compact disk waste as set forth in claim 1.

9. A resin composition reclaimed from compact disk waste comprising:
    (a) 35–95 parts by weight of compact disk waste comprising polycarbonate as a primary component;
    (b) 65–5 parts by weight of an impact-resistant thermoplastic resin; and
    (c) 0.1–15 wt %, based on the total weight of the component (a) and (b), of a coupling agent containing two or more reactive functional groups.

10. The resin composition as claimed in claim 9, wherein said impact-resistant thermoplastic resin is selected from the group consisting of acrylonitrile-butadiene-styrene copolymer, methacrylate-butadiene-styrene copolymer, acrylonitrile-acrylic rubber-styrene copolymer, acrylonitrile-ethylene propylene rubber-styrene copolymer, acrylonitrile-chlorinated polyethylene rubber-styrene copolymer, polybutylene terephthalate, polyethylene terephthalate, acrylic rubber, styrene-butadiene-styrene block copolymer, and styrene-ethylented-butadiene-styrene elastomer.

11. The resin composition as claimed in claim 9, wherein said coupling agent is selected from the group consisting of anhydrides, isocyanates, epoxides, and urethanes.

12. The resin composition as claimed in claim 11, wherein said coupling agent is an anhydride selected from the group consisting of pyromellitic dianhydride, 3,3',4,4'-benzophenone tetracarboxylic dianhydride, 3,3', 4,4'-biphenyl tetracarboxylic dianhydride, terphenyl tetracarboxylic dianhydride, 2,2-bis(3,4-dicarboxyphenyl) hexafluoropropane dianhydride, 1,1-bis(3,4-dicarboxyphenyl anhydride)-1-phenyl-2,2,2-trifluoroethane, 9,9-bis (trifluoromethyl)-2,3,6,7-xanthene tetracaboxylic dianhydride, and trimellitic anhydride.

13. The resin composition as claimed in claim 11, wherein said coupling agent is an isocyanate selected from the group consisting of tris(2-carboxylethyl) isocyanate, diphenylmethane-4,4'-diisocyanate, polymethylenephenylene isocyanate, hexamethylene diisocyanate, toluene diisocyanate, 1,5-naphthalene diisocyanate, 4,6'-xylene diisocyanate, 3,3'-dimethyldiphenyl 4,4'-diisocyanate, paraphenylene diisocyanate, 3,3'-dimethyl-diphenylmethane 4,4'-diisocyanate, and dianisidine diisocyanate.

14. The resin composition as claimed in claim 11, wherein said coupling agent is an epoxide selected from the group consisting of epoxidized styrenic copolymer, epoxidized olefinic copolymer, glycerol polyglycidyl ether, diglycidyl terephthalate, diglycidyl orthophthalate, and pentaerythritol polyglycidyl ether.

15. The resin composition as claimed in claim 9, further comprising a flame retardant.

16. The resin composition as claimed in claim 9, further comprising an additive selected from the group consisting of reinforced fibers, fillers, antioxidants, heat stabilizers, and lubricants.

17. A molded article made from a resin composition reclaimed from compact disk waste as set forth in claim 9.

18. A resin composition reclaimed from compact disk waste comprising:
    (a) 30–90 parts by weight of compact disk waste comprising polycarbonate as a primary component;
    (b) 70–10 parts by weight of engineering plastic grade polycarbonate or waste thereof, or recycled bottle grade polycarbonate; and
    (c) 0.1–15 wt %, based on the total weight of the component (a) and (b), of a coupling agent containing two or more reactive functional groups.

19. The resin composition as claimed in claim 18, wherein said coupling agent is selected from the group consisting of anhydrides, isocyanates, epoxides, and urethanes.

20. The resin composition as claimed in claim 19, wherein said coupling agent is an anhydride selected from the group consisting of pyromellitic dianhydride, 3,3',4,4'-benzophenone tetracarboxylic dianhydride, 3,3', 4,4'-biphenyl tetracarboxylic dianhydride, terphenyl tetracarboxylic dianhydride, 2,2-bis(3,4-dicarboxyphenyl) hexafluoropropane dianhydride, 1,1-bis(3,4-dicarboxyphenyl anhydride)-1-phenyl-2,2,2-trifluoroethane, 9,9-bis (trifluoromethyl)-2,3,6,7-xanthene tetracaboxylic dianhydride, and trimellitic anhydride.

21. The resin composition as claimed in claim 19, wherein said coupling agent is an isocyanate selected from the group consisting of tris(2-carboxylethyl) isocyanate, diphenylmethane-4,4'-diisocyanate, polymethylenephenylene isocyanate, hexamethylene diisocyanate, toluene diisocyanate, 1,5-naphthalene diisocyanate, 4,6'-xylene diisocyanate, 3,3'-dimethyldiphenyl 4,4'-diisocyanate, paraphenylene diisocyanate, 3,3'-dimethyl-diphenylmethane 4,4'-diisocyanate, and dianisidine diisocyanate.

22. The resin composition as claimed in claim 19, wherein said coupling agent is an epoxide selected from the group consisting of epoxidized styrenic copolymers, epoxidized olefinic copolymer, glycerol polyglycidyl ether, diglycidyl terephthalate, diglycidyl orthophthalate, and pentaerythritol polyglycidyl ether.

23. The resin composition as claimed in claim 18, further comprising a flame retardant.

24. The resin composition as claimed in claim 18, further comprising an additive selected from the group consisting of reinforced fibers, fillers, antioxidants, heat stabilizers, and lubricants.

25. A molded article made from a resin composition reclaimed from compact disk waste as set forth in claim 18.

* * * * *